United States Patent [19]
Hoshi et al.

[11] Patent Number: 5,499,104
[45] Date of Patent: Mar. 12, 1996

[54] APPARATUS FOR RECORDING A VIDEO SIGNAL AND STEREOPHONIC AUDIO SIGNALS

[75] Inventors: Hidenori Hoshi, Yokohama; Yasuyuki Tanaka, Tokyo, both of Japan

[73] Assignee: Canon Kabushiki Kaisha, Tokyo, Japan

[21] Appl. No.: 77,406

[22] Filed: Jun. 16, 1993

Related U.S. Application Data

[63] Continuation of Ser. No. 798,945, Nov. 27, 1991, abandoned.

[30] Foreign Application Priority Data

Nov. 29, 1990 [JP] Japan ................................. 2-326019

[51] Int. Cl.⁶ ............................. H04N 5/76; H04N 5/91; G11B 5/02
[52] U.S. Cl. ........................ 358/341; 358/343; 360/19.1
[58] Field of Search ........................... 360/19.1, 32, 10.3, 360/10.2, 10.1, 18, 8, 9, 33.1; 358/335, 310, 341, 342, 312, 321, 338; 369/4, 5; H04N 5/76, 5/91, 5/92, 9/79, 5/78

[56] References Cited

U.S. PATENT DOCUMENTS

| | | | |
|---|---|---|---|
| 4,303,950 | 12/1981 | Taniguchi et al. | 360/19.1 |
| 4,445,151 | 4/1984 | Kinoshita et al. | 358/341 |
| 4,523,236 | 6/1985 | Hayashi et al. | 358/341 |
| 4,709,275 | 11/1987 | Fukuda | 358/343 |
| 4,751,590 | 6/1988 | Wilkinson | 358/343 |
| 4,864,428 | 9/1989 | Kanamaru | 358/341 |
| 4,901,159 | 2/1990 | Hitotsumachi | 358/341 |
| 4,905,094 | 2/1990 | Pocock et al. | 358/341 |
| 5,032,927 | 7/1991 | Watanabe et al. | 358/343 |
| 5,083,212 | 1/1992 | Owa et al. | 358/343 |
| 5,218,454 | 6/1993 | Nagawasa et al. | 358/343 |
| 5,359,463 | 10/1994 | Shirochi et al. | 358/343 |

*Primary Examiner*—Thai Q. Tran
*Attorney, Agent, or Firm*—Fitzpatrick, Cella, Harper & Scinto

[57] ABSTRACT

An apparatus for recording a video signal and audio signals includes a recording device having a first mode in which a video signal transmitted through a compressing unit for compressing an information amount and a sum signal of the right and left signals of a stereophonic audio signal are recorded into the first area on the recording medium and a difference signal of the right and left signals of the stereophonic audio signal is recorded into a second area on the recording medium; and a second mode in which the video signal which is not transmitted through the compressing unit and the right and left signals are recorded into the first area. Thus, even when an audio signal has been after-recorded into the second area, reproduction the audio signal without a sense of disorder can be performed.

34 Claims, 6 Drawing Sheets

FIG. IA
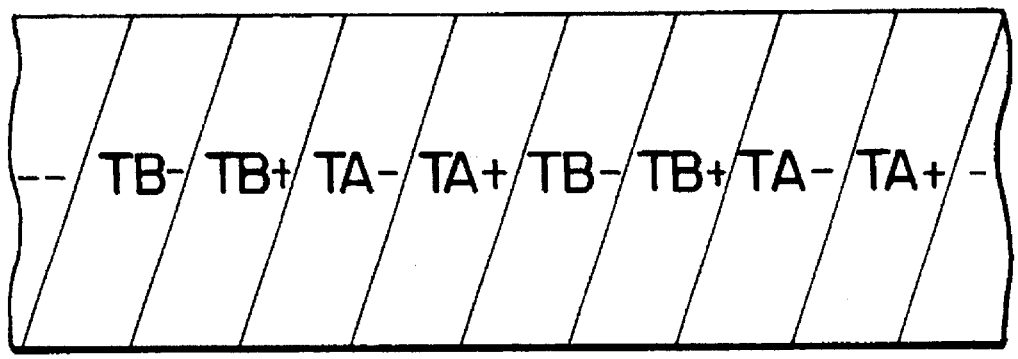
FIG. IB
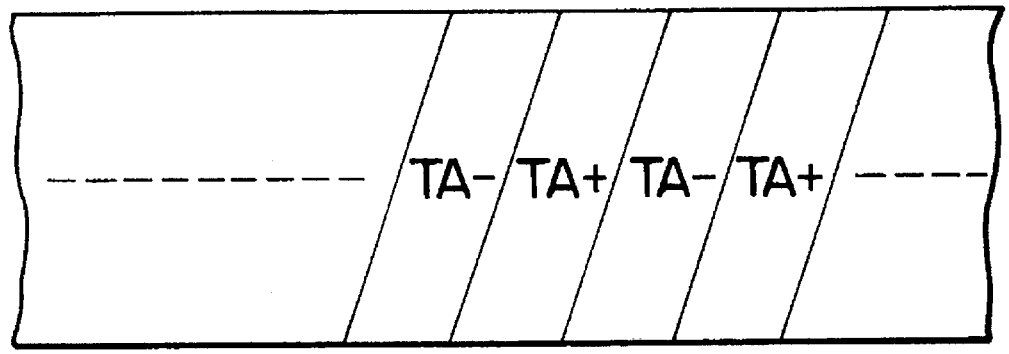

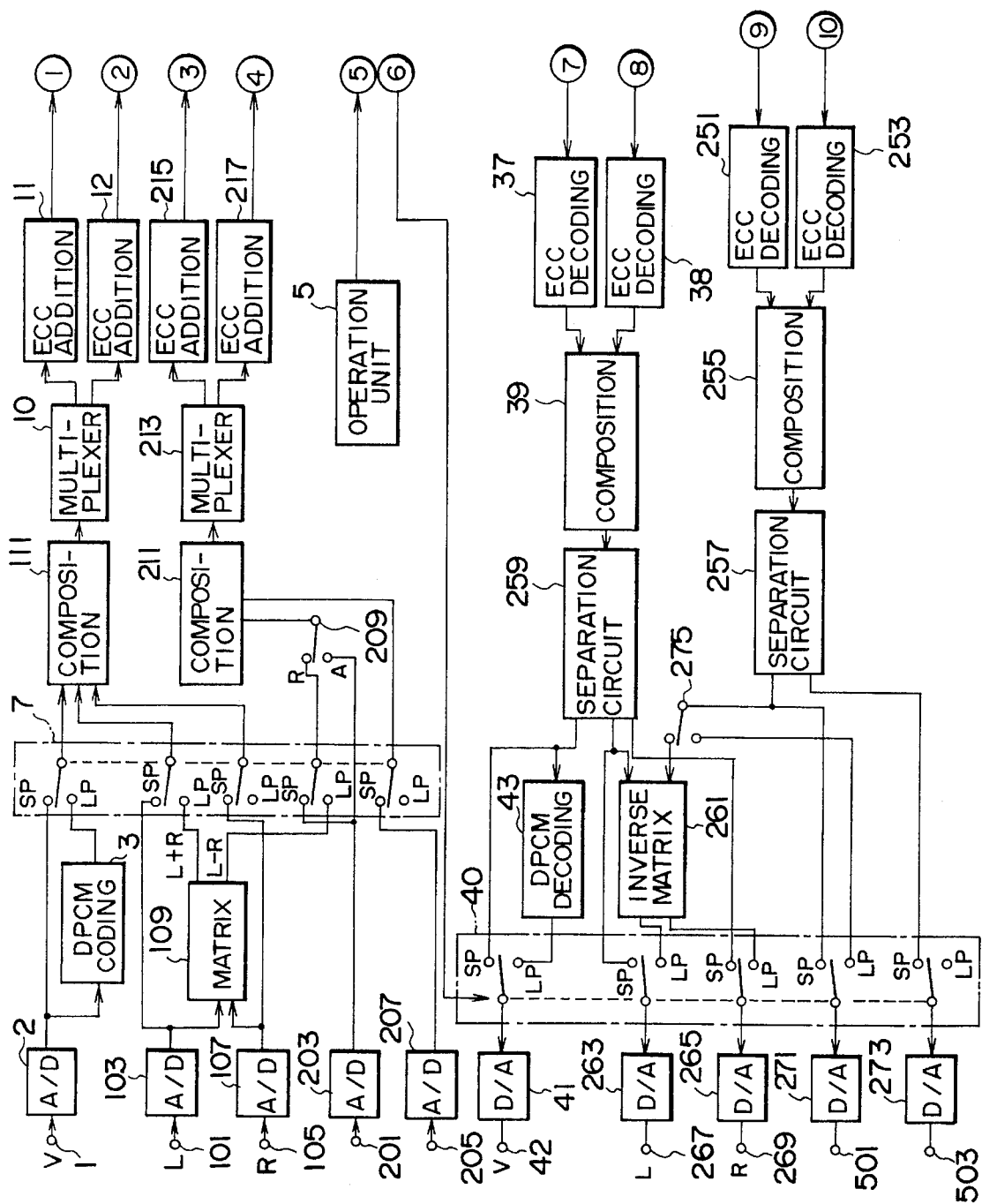

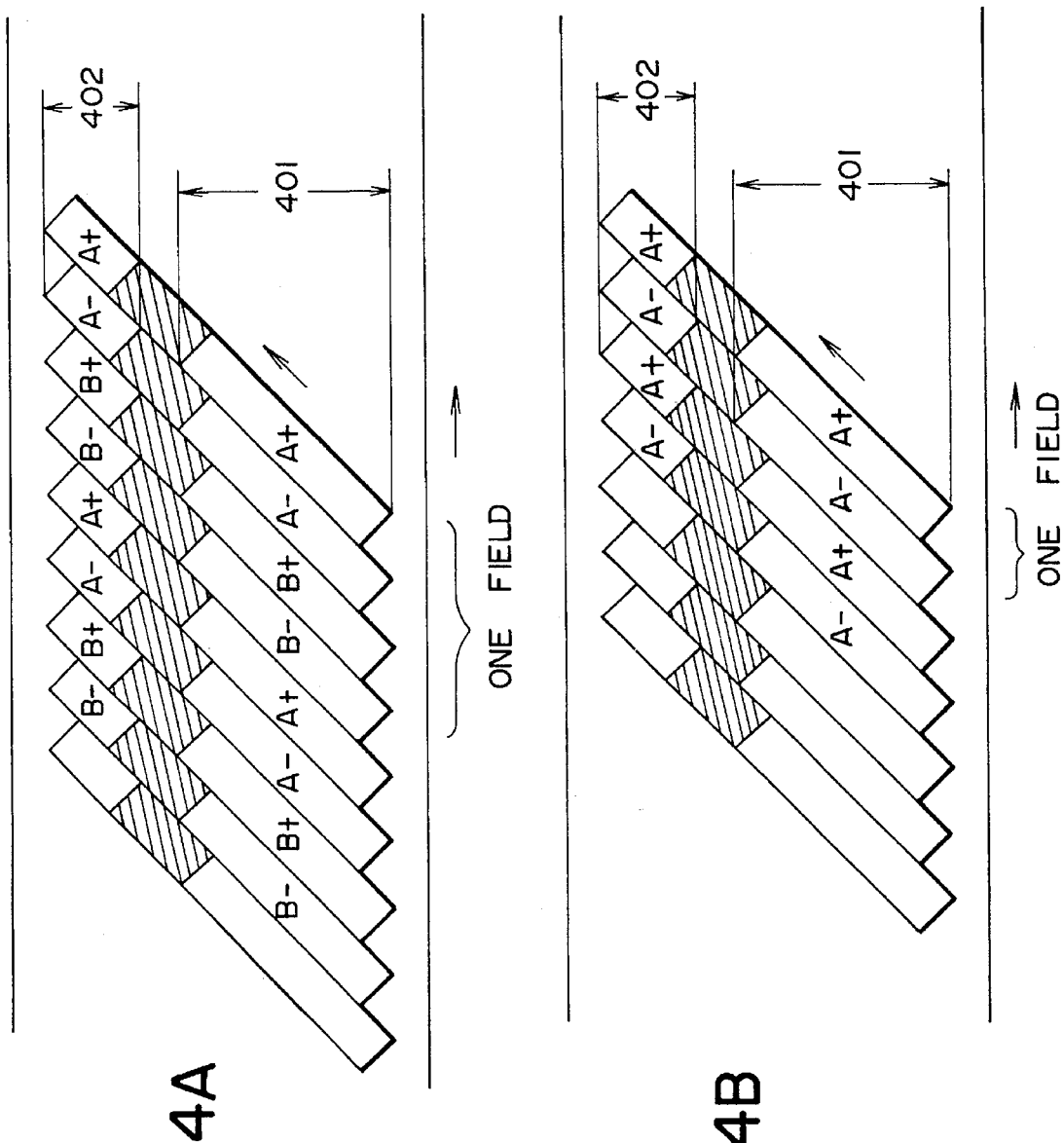

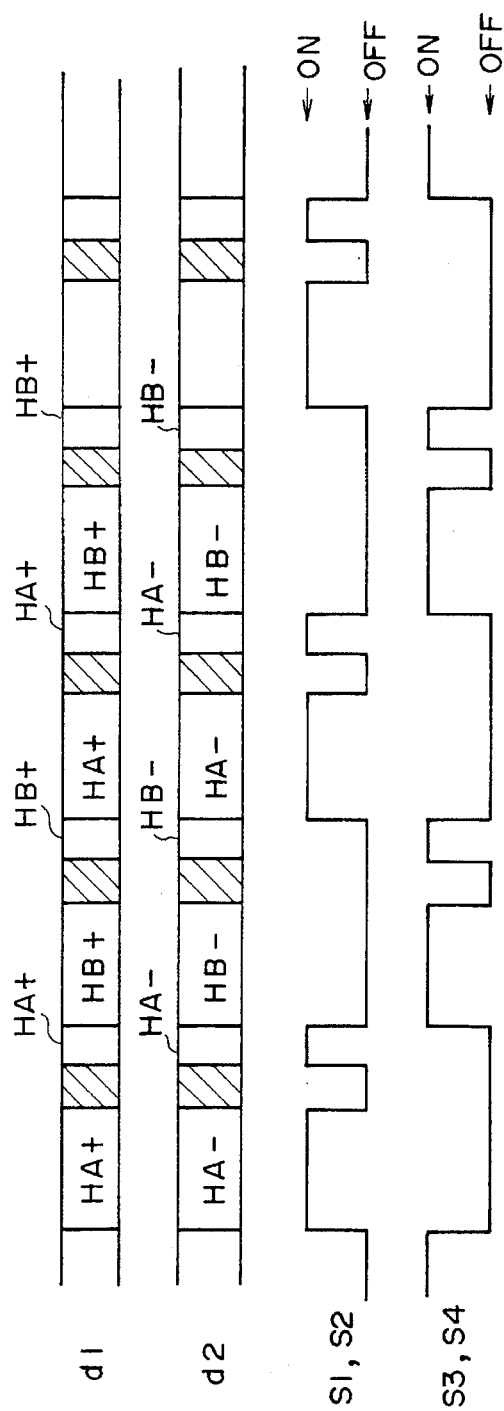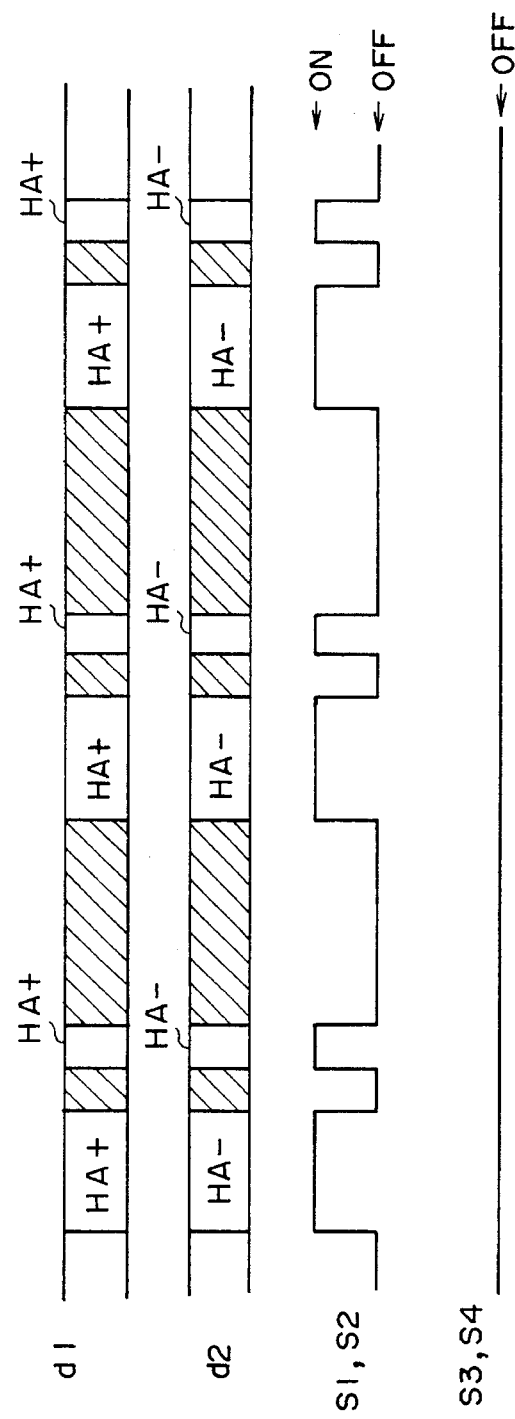

APPARATUS FOR RECORDING A VIDEO SIGNAL AND STEREOPHONIC AUDIO SIGNALS

This application is a continuation of application Ser. No. 07/798,945 filed Nov. 27, 1991, now abandoned.

BACKGROUND OF THE INVENTION

1. Field of the Invention

The invention relates to a signal recording apparatus and, more particularly, to an apparatus for digitally recording an audio signal and a video signal.

2. Related Background Art

Hitherto, for instance, as a digital video tape recorder (VTR), there are considered a VTR of the type in which a recording area (video area) for a video signal and a recording area (audio area) for an audio signal are separately provided on a recording track of a tape, both the video and audio signals are processed by signal processing circuits provided separately and the recording and reproduction are executed, and a VTR of the type in which both the video signal and the audio signal are recorded into the same area (video area). In the digital VTR of any of the above two types, there is known an apparatus in which the left channel (LCH) signal and the right channel (RCH) signal of the stereophonic audio signal are recorded and reproduced for every channel, and a subarea is provided to enable after recording of an audio signal into the subarea.

In the conventional VTR of the analog recording and reproducing system, a VTR having not only the standard recording mode but also the long playing mode whose recording time is longer than that in the standard recording mode is known. A method of realizing the two modes even in the VTR of the digital recording and reproducing system is considered. That is, in the digital VTR, digital signals are recorded at a track pitch at which the lowest allowable S/N ratio that enables reproduction is obtained and the track pitch itself cannot be changed. In the digital VTR, therefore, in the long playing mode, an amount of digital data to be recorded is reduced (band compression) to an amount smaller than that in the standard mode, thereby coping with such a long playing mode. For instance, an amount of information which is recorded per unit time is changed every mode in a manner such that a track pattern as shown in FIG. 1A is formed in the standard mode using two pairs of heads (total of four heads) which are attached to the outer periphery of a rotary cylinder in a manner such that each pair of heads have a phase difference of 180° and that a track pattern as shown in FIG. 1B is formed in the ½ speed mode (i.e., double recording time mode). In FIG. 1, the recording tracks are shown on the assumption that the track on/from which a signal is recorded and reproduced by one of the heads of one pair is set to TA+, the track on/from which a signal is recorded and reproduced by the other head of the above pair is set to TA−, the track on/from which a signal is recorded and reproduced by one of the heads of the other pair is set to TB+, and the track on/from which a signal is recorded and reproduced by the other head of the above other pair is set to TB−, respectively.

In the above conventional apparatus, however, the information amount of the image signal is compressed into a fraction of an integer but an information amount of the audio signal is not compressed. Therefore, for instance, assuming that an area to record the audio signals of two channels is assured in the same area as that of the image signal and an area to record the audio signals of two channels is assured in the subarea for the after recording in the standard mode, only the audio signal of one channel can be recorded in the same area as that of the image signal and only the audio signal of one channel can be recorded in the subarea for the after recording in the long playing mode in which the double recording time is obtained. Now, assuming that the left or right signal of the stereophonic audio signal has been recorded into the same area as that of the image signal and the right or left signal has been recorded into the subarea for the after recording in the long playing mode, when the after recording is executed for the above recorded tape, the information on either the right or left side of the stereophonic audio signal drops out, so that an unnatural reproduction signal is derived.

SUMMARY OF THE INVENTION

It is an object of the present invention to solve the problems as mentioned above.

Another object of the invention is to provide a recording apparatus having a plurality of recording modes in which information amounts which can be recorded per unit time differ, in which an optimum audio signal can be recorded in any one of the modes.

Under such objects, according to the present invention, as one embodiment, there is disclosed a signal recording apparatus comprising: (a) video input means for inputting a video signal; (b) audio input means for inputting a right signal and a left signal of a stereophonic audio signal, a sum signal of the right and left signals, and a difference signal of the right and left signals; (c) compressing means for compressing an information amount of the video signal; (d) recording means for recording signals into first and second areas on a recording medium; and (e) mode switching means for switching a mode of the apparatus among a plurality of modes, wherein the plurality of modes include (i) a first mode in which the recording means records the video signal derived through the compressing means and the sum signal into the first area and records the difference signal into the second area, and (ii) a second mode in which the recording means records the video signal which is not transmitted through the compressing means and the right and left signals into the first area.

The above and other objects and features of the present invention will become apparent from the following detailed description and the appended claims with reference to the accompanying drawings.

BRIEF DESCRIPTION OF THE DRAWINGS

FIGS. 1A and 1B are diagrams showing track patterns in a conventional digital VTR;

FIGS. 4A and 4B are diagrams showing track patterns in the digital VTR of FIG. 2; and FIGS. 5A and 5B are block diagrams for explaining the operation of the digital VTR of FIG. 2.

DETAILED DESCRIPTION OF PREFERRED EMBODIMENTS

An embodiment of the invention will be described in detail hereinbelow with reference to the drawings.

Figure 2B:
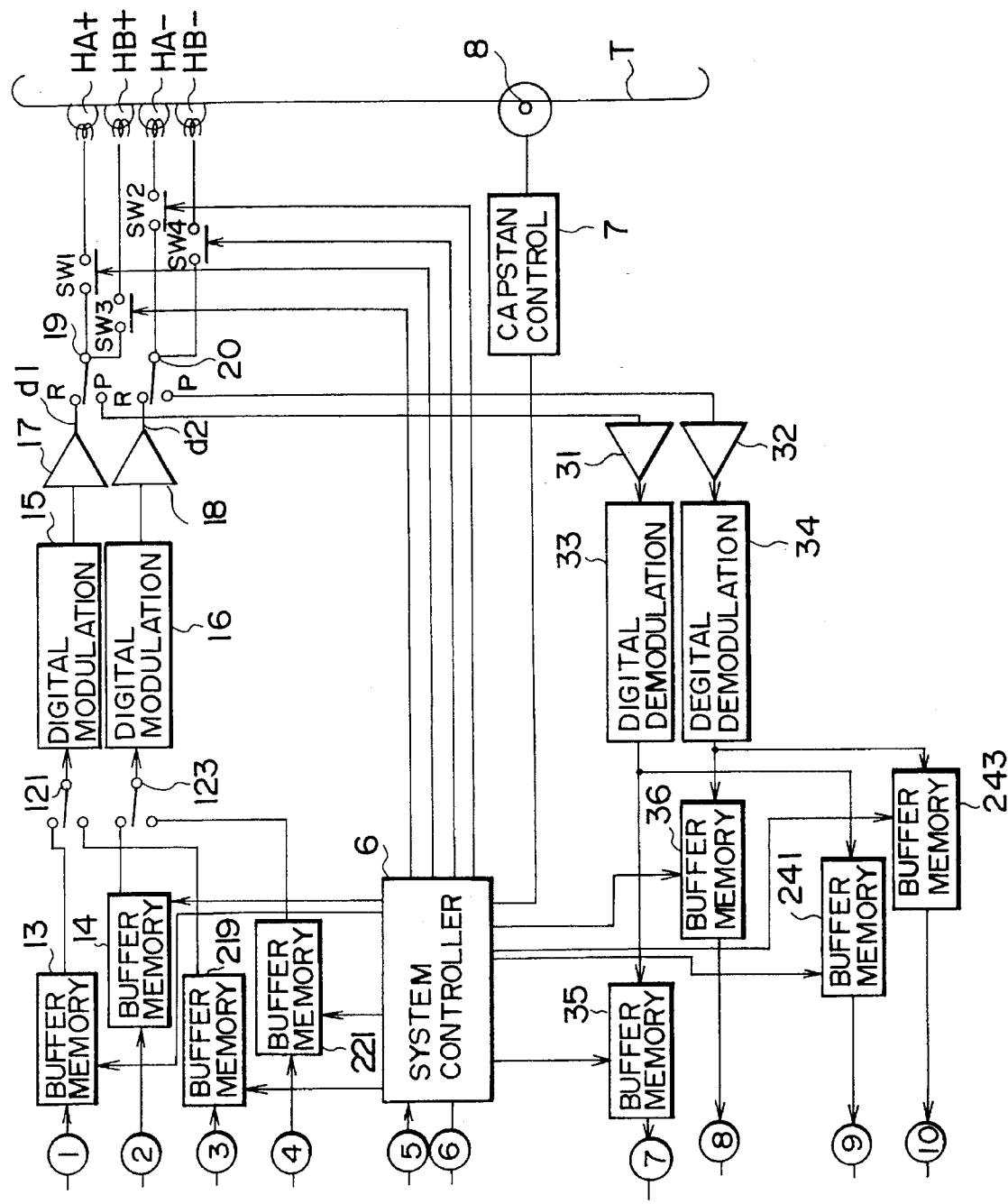
FIG. 2 is a block diagram showing a schematic construction of a digital VTR according to an embodiment of the invention.

FIG. 2 is a diagram showing a schematic construction of a digital VTR as an embodiment of the invention. An analog video signal of the interlace scanning system in which one frame is constructed by two fields is supplied to an input terminal 1.

The input analog video signal is sampled by an analog-digital (A/D) converter 2 by sampling signals whose frequency is two or more times as high as the highest input signal frequency and is converted into a digital signal of about eight bits.

Reference numeral 3 denotes a DPCM coding circuit for receiving the 8-bit digital signal generated from the A/D converter 2, for obtaining a difference between pixels having a correlation, and for compressing the signal into the signal of four bits by referring to a non-linear table with respect to the difference value. Since an image has many flat portions or the like, there is a correlation among the pixels. By using the DPCM coding circuit 3, therefore, the data amount can be reduced by ½ without largely deteriorating the picture quality.

It is assumed that the audio signal of the left channel in the analog stereophonic audio signal is supplied to an input terminal 101. The input audio signal of the left channel is sampled at a frequency of about 48 kHz by an analog-digital (A/D) converter 103 and converted into the digital signal of about 16 bits.

Similarly, the audio signal of the right channel of the stereophonic audio signal is supplied to an input terminal 105 and likewise converted into the digital signal by an A/D converter 107. Matrix means 109 arithmetically operates on the digital signals from the two A/D converters 103 and 107, thereby calculating the sum signal (L+R) and difference signal (L−R) of the stereophonic audio signal and generating those signals.

Figure 3B:
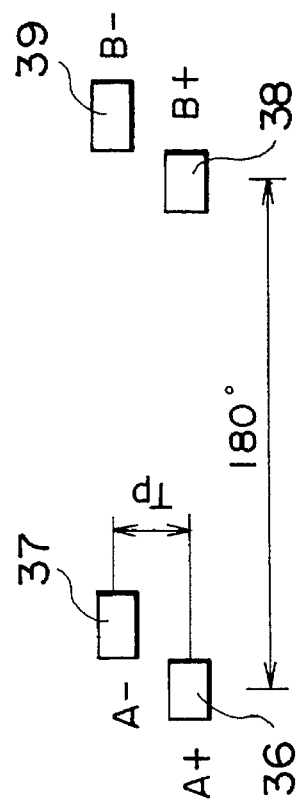
FIGS. 3A and 3B are diagrams showing head constructions in the digital VTR of FIG. 2.
Figure 3A:
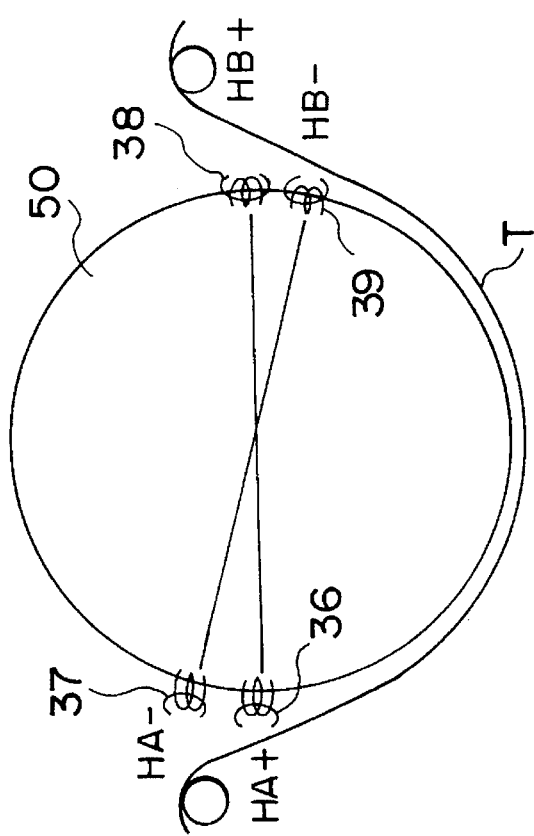

FIGS. 3A and 3B are diagrams showing head constructions of the digital VTR of the embodiment. As shown in FIG. 3A, a magnetic tape T is wound around the outer peripheral surface of a rotary cylinder 50 in an angular range of 180° or more. Heads HA+ (shown by reference numeral 36) and HB+ (38) each having a plus azimuth and heads HA− (37) and HB− (39) each having a minus azimuth are attached to the outer peripheral portion of the cylinder 50. The heads HA+ and HB+ rotate with a phase difference of 180°. The heads HA− and HB− similarly rotate with a phase difference of 180°.

It is assumed that the VTR of the embodiment has two kinds of recording modes. The mode to record all of the data which is generated from the A/D converter 2 is hereinafter called a standard mode. The mode to record the data in which the amount of information which is generated from the DPCM coding circuit 3 is reduced by ½ is hereinafter called a ½ speed mode. A desired one of the recording modes is designated by the user upon recording by manually operating an operation unit 5. In accordance with the designated recording mode, a system controller 6 connects a switch 7 to either an SP (standard mode) terminal or an LP (½ speed mode) terminal.

The recording operation of each head in each of the SP and LP modes will now be described. The cylinder 50 rotates twice for a period of time when the video signal of one frame is supplied to the terminal 1. That is, in the case where an NTSC signal is supplied, a rotational speed of the cylinder 50 is set to 3600 r.p.m. In the SP mode, each head traces every twice on the tape T for a period of time when the cylinder 50 rotates twice. The signal is recorded by all of the above traces. For the recording period of time, the tape T is run at a constant velocity by a capstan 8 which is driven by a capstan control circuit 27 which operates under control of the system controller 6 in a manner such that eight tracks are formed at a predetermined track pitch $T_p$ for the video signal of one frame.

In the ½ speed mode, the signal is recorded by two tracing operations of the heads HA+ and HA− for a period of time when the cylinder 50 rotates twice and the recording by the heads HB+ and HB− is not performed. In the ½ speed mode, the tape T is run at a speed of ½ of that in the standard mode by the capstan 8.

Explanation will now be continued returning to FIG. 2.

Composition means 111 synthesizes the digital image signal of 8 bits from the A/D converter 2 and the audio signals of the left and right channels from the A/D converters 103 and 107 in the standard mode and supplies the synthesized composite signal to a multiplexer 10. The composition means 111 synthesizes the digital image signal of four bits from the DPCM coding circuit 3 and the stereophonic sum signal (L+R) from the matrix means 109 in the ½ speed mode and supplies the synthesized composite signal to the multiplexer 10. An information amount of the data in the ½ speed mode is consequently reduced by ½ as compared with that in the standard mode.

Reference numeral 201 denotes an input terminal of the first channel for an additional audio signal to be recorded into the after recording area. The input signal from the input terminal 201 is converted into the digital signal by an A/D converter 203. Reference numeral 205 denotes an input terminal of the second channel for an additional audio signal to be recorded into the after recording area. The input signal from the input terminal 205 is converted into the digital signal by an A/D converter 207.

The additional audio signals are selected by the switch 7 and both of them are directly supplied to composition means 211 in the standard mode. In the ½ speed mode, when the additional audio signals are recorded simultaneously with the image signal, only the stereophonic difference signal (L−R) from the matrix means 109 is supplied to the composition means 211 through the switches 7 and 209. On the other hand, upon after recording in the ½ speed mode, by connecting the switch 209 to the A side, only the additional audio signal from the terminal 201 is supplied to the composition means 211 through the A/D converter 203.

In FIG. 2, the signal generated from the composition means 111 is divided into the signals of two systems by the multiplexer 10. An error detection code (ECC) is formed by each of error detection code (ECC) adding circuits 11 and 12 for the signal of each system. The ECCs are supplied to buffer memories 13 and 14.

On the other hand, the signal generated from the composition means 211 is also divided into the signals of two systems by a multiplexer 213. An ECC is formed by each of ECC adding circuits 215 and 217 for the signal of each system. The ECCs are supplied to buffer memories 219 and 221.

FIGS. 4A and 4B are diagrams showing recording loci on the tape T in the standard mode and the ½ speed mode. In the standard mode, the video signal of one field is recorded by four tracks. In the ½ speed mode, the video signal of one field is recorded by two tracks. In the diagrams, A+, A−, B+ and B− denote tracks recorded by the heads HA+, HA−, HB+ and HB−, respectively. A portion designated by reference numeral 401 indicates a main area to record the information from the buffer memories 13 and 14. A portion indicated by 402 denotes an after recording area to record the information from the buffer memories 219 and 221. A hatched portion denotes a transition area (gap area) which is provided to record the portion 402 while reproducing the portion 401.

Predetermined amounts of data are generated from the buffer memories 13 and 14 and from the buffer memories 219 and 221 by the system controller 6 every period of time when the cylinder 50 rotates by ½ rotation (180°). The data read out of the buffer memories 13 and 14 and from the buffer memories 219 and 221 pass through switches 121 and 123 and are subjected to the modulation such as a well-known mapping encoding or the like by digital modulation circuits 15 and 16. The data are further transmitted through amplifiers 17 and 18 and R side terminals of switches 19 and 20 and are generated from the switches 19 and 20 as recording signals $d_1$ and $d_2$ of two systems.

Switches $SW_1$ and $SW_3$ are provided between the switch 19 and the heads HA+ and HB+. Switches $SW_2$ and $SW_4$ are provided between the switch 20 and the heads HA– and HB–. FIGS. 5A and 5B are timing charts showing control signals $S_1$, $S_2$, $S_3$ and $S_4$ of the switches $SW_1$, $SW_2$, $SW_3$ and $SW_4$ to record the recording signals of two systems as mentioned above onto the tape T and also show switching states of the recording signals $d_1$ and $d_2$ to the recording heads in accordance with the control signals. FIG. 5A is a timing chart in the standard mode and FIG. 5B is a timing chart in the ½ speed mode. In the diagrams, it is assumed that the switches $SW_1$ to $SW_4$ are turned on when the signals $S_1$ to $S_4$ are at the high level. The hatched portion denotes that no recording signal exists.

A construction of the reproducing system of the digital VTR in the embodiment will now be described. The switches $SW_1$ to $SW_4$ are controlled at timings similar to those in the recording mode, so that reproduction signals of two systems are derived from P side terminals of the switches 19 and 20. The reproduction signals of two systems are supplied to digital demodulation circuits 33 and 34 through amplifiers 31 and 32 and demodulated. The demodulated data are written into buffer memories 35 and 36 with respect to the portions 401 in FIGS. 4A and 4B by the system controller 6 and are written into buffer memories 241 and 243 with regard to the portions 402 in FIGS. 4A and 4B.

The data from the buffer memories 35 and 36 are supplied to ECC decoding circuits 37 and 38 and subjected to the foregoing error correction using the ECC. The error corrected data are synthesized into the original data signal of one system by a composition circuit 39 and separated into the image signal and the audio signals by a separation circuit 259 and outputted.

On the other hand, the data from the buffer memories 241 and 243 are supplied to ECC decoding circuits 251 and 253 and error corrected. The error corrected data are synthesized into the original data signal of one system by a composition circuit 255. The data signal is generated as an audio signal of two channels in the standard mode and as an audio signal of one channel in the ½ speed mode by a separating circuit 257.

In the case of the signal recorded in the standard mode as an image signal which has been separated and generated from the separating circuit 259, the output data of the composition circuit 39 is directly supplied to a digital-analog (D/A) converter 41 through an SP terminal of a switch 40 which is controlled by the system controller 6 and is reconstructed as an analog video signal and is supplied to an output terminal 42. In the case of the signal recorded in the ½ speed mode, the data compressed in the amplitude direction by a DPCM decoding circuit 43 is returned to the original data and, thereafter, it is supplied to the D/A converter 41 through an LP terminal of the switch 40.

As an audio signal separated by the separation circuit 259, in the case of the signal recorded in the standard mode, the data of two right and left channels are derived. The data of the left channel is supplied to a D/A converter 263 through the switch 40 and the data of the right channel is supplied to a D/A converter 265 through the switch 40. The data of the left and right channels are supplied as analog audio signals to output terminals 267 and 269.

In the case of the signal recorded in the ½ speed mode, the data of the sum signal (L+R) of the stereophonic audio signals is obtained by the separating circuit 259 and supplied to an inverse matrix circuit 261. In the case where the stereophonic difference signal (L–R), which will be explained hereinlater, is not supplied to the inverse matrix circuit 261, the data (L+R) is directly supplied to both of the DA converters 263 and 265 through the switch 40 and generated as an analog monaural signal.

On the other hand, as an audio signal separated by the separation circuit 257, in the case of the signal recorded in the standard mode, the data of two channels are obtained as additional audio signals. The above audio signals of two channels are transmitted through the switch 40 and converted into the analog audio signals by D/A converters 271 and 273 and supplied to output terminals 501 and 503.

In the case of the signal recorded in the ½ speed mode, since either one of the data of the stereophonic difference signal (L–R) and the signal data which has been after-recorded is obtained, a switch 275 is switched in accordance with the signal obtained. That is, the data of the stereophonic difference signal (L–R) is supplied to the inverse matrix circuit 261 and is matrix operated together with the data of the stereophonic sum signal (L+R), so that the stereophonic right and left signals are obtained from the inverse matrix circuit 261. The stereophonic audio signals of the right and left channels are supplied as stereophonic signals to the D/A converters 263 and 265 through the switch 40. On the other hand, the additional audio signal which has been after-recorded is supplied to the D/A converter 271 through the switch 40. 10 The switching operations of the switches 40 and 275 can be executed by the operation of the operation unit 5 or information indicative of the recording mode is recorded in the recording signal and the system controller 6 can also perform such switching operations on the basis of such information reproduced from the recording signal.

As mentioned above, in the digital VTR in he embodiment, the audio signals of two channels can be recorded into the same area as that of the image signal on the magnetic tape and the audio signals of two channels can be recorded into the area in which the after-recording can be performed in the standard mode. On the other hand, the sum signal of the stereophonic signals is recorded into the same area as that of the image signal and the difference signal of the stereophonic signals is recorded into the area in which the after-recording can be performed in the ½ speed mode. Thus, even after a signal was after-recorded onto the magnetic tape on which the stereophonic signals had been recorded in the ½ speed mode, the monaural signal regarding the relevant stereophonic signals can be reproduced in a natural state. In the case of considering VTR having a construction such that the after recording is unnecessary, the stereophonic signals of two channels an be recorded in the standard mode and the stereophonic signal of one channel can be recorded in the ½ speed mode. There is an advantage such that there is a compatibility with the recording and reproduction performed by the construction in which the after recording is possible which has been described above.

What is claimed is:

1. A signal recording apparatus comprising:
   (a) video input means for inputting a video signal;
   (b) audio input means for inputting a right signal and a left signal of a stereophonic audio signal, a sum signal of said right and left signals, and a difference signal of said right and left signals;
   (c) video signal processing means, including compressing means for compressing an information amount of the input video signal, for receiving the input video signal and selectively outputting one of a first video signal having an information amount compressed by said compressing means and a second video signal having an information amount greater than that of the first video signal;
   (d) recording means for recording signals into first and second areas on a recording medium; and
   (e) mode switching means for switching a mode of said apparatus among a plurality of modes,
   wherein said plurality of modes includes
   a first mode in which the recording means records the first video signal and the sum signal into the first area and records the difference signal into the second area, and
   a second mode in which the recording means records the second video signal and the right and left signals into the first area.

2. An apparatus according to claim 1, further comprising additional audio input means for inputting an additional audio signal,
   and wherein the recording means records said additional audio signal into the second area in the second mode.

3. An apparatus according to claim 2, wherein said additional audio signal comprises audio signals of two channels.

4. An apparatus according to claim 1, wherein the audio input means includes a matrix circuit to form the sum signal and the difference signal by using the right and left signals.

5. An apparatus according to claim 1, further comprising additional audio input means for inputting an additional audio signal, and wherein said plurality of modes includes an after recording mode in which the recording means records the additional audio signal into the second area.

6. An apparatus according to claim 5, wherein in the after recording mode, the additional input signal comprises a signal of one channel which is recorded into the second area on the recording medium when the first video signal and the sum signal have been recorded into the first area.

7. An apparatus according to claim 5, wherein in the after recording mode, the additional audio signal comprises signals of two channels which are recorded into the second area on the recording medium which has been recorded in the second mode.

8. An apparatus according to claim 1, wherein the recording medium is a tape-shaped recording medium and the recording means includes rotary heads which obliquely trace on the tape-shaped recording medium, thereby sequentially forming a number of tracks which are in parallel with each other.

9. An apparatus according to claim 8, wherein the recording means forms a predetermined number of tracks per unit time in the first mode and forms a number of tracks larger than said predetermined number per said unit time in the second mode.

10. An apparatus according to claim 8, wherein the first and second areas are provided for each of said number of tracks.

11. A signal recording apparatus, comprising:
   (a) video input means for inputting a video signal;
   (b) audio input means for inputting stereophonic audio signals of two channels, a sum signal of a right signal and a left signal of the stereophonic audio signals and a difference signal of said right and left signals;
   (c) video signal processing means, including compressing means for compressing an information amount of the input video signal, for receiving the input video signal and selectively outputting one of a first video signal having an information amount compressed by said compressing means and a second video signal having an information amount greater than that of the first video signal;
   (d) recording means for recording signals into first and second areas on a recording medium; and
   (e) mode switching means for switching a mode of said apparatus among a plurality of modes,
   wherein said plurality of modes includes
   a first mode in which the recording means records the first video signal and the sum signal into the first area and records the difference signal into the signal area, and
   a second mode in which the recording means records the second video signal and the stereophonic audio signals of two channels into the first area.

12. An apparatus according to claim 11, further comprising additional audio input means for inputting an additional audio signal of one channel, and wherein said plurality of modes includes an after recording mode in which the recording means records the additional audio signal of one channel into the second area when the first video signal and the sum signal have been recorded into the first area.

13. An apparatus according to claim 11, further comprising additional audio input means for inputting an additional audio signal of two channels, and wherein said plurality of modes includes an after recording mode in which the recording means records the additional audio signal into the second area on the recording medium which has been recorded in the second mode.

14. A signal recording apparatus comprising:
   (a) video input means for inputting a video signal;
   (b) audio input means for inputting a sum signal of a right signal and a left signal of a stereophonic audio signal and a difference signal of said right and left signals;
   (c) carrying means for carrying a tape-shaped recording medium in a longitudinal direction;
   (d) recording means for recording signals into first and second areas on the recording medium;
   (e) mode switching means for switching a mode of said apparatus among a plurality of modes,
   wherein said plurality of modes include
      first mode in which the carrying means carries the tape-shaped recording medium at a first speed and the recording means records the video signal and the sum signal into the first area and records the difference signal into the second area, and
      second mode in which the carrying means carries the tape-shaped recording medium at a second speed higher than the first speed and the recording means records the video signal and stereophonic audio signals of two channels into the first area.

15. An apparatus according to claim 14, further comprising additional audio input means for inputting an additional audio signal of one channel, and wherein said plurality of modes includes an after recording mode in which the carrying means carries the tape-shaped recording medium at the first speed and the recording means records the additional audio signal of one channel into the second area.

16. An apparatus according to claim 14, further comprising additional audio input means for inputting an additional audio signal of two channels, and wherein said plurality of modes includes an after recording mode in which the carrying means carries the tape-shaped recording medium at the second speed and the recording means records the additional audio signal of two channels into the second area.

17. A signal recording apparatus comprising:
(a) video input means for inputting a video signal;
(b) audio input means for inputting a sum signal of a right signal and a left signal of a stereophonic audio signal and a difference signal of said right and left signals;
(c) recording means for recording a signal onto a recording medium by rotary heads which periodically trace on the recording medium; and
(d) mode switching means for switching a mode of said apparatus among a plurality of modes,
wherein said plurality of modes include
first mode in which the recording means forms a first predetermined number of tracks per unit time and records the video signal and the sum signal into a first area on each track and records the difference signal into a second area on each track, and
second mode in which the recording means forms a second predetermined number of tracks larger than said first predetermined number per said unit time and records the video signal and stereophonic audio signals of two channels into the first area on each track.

18. A signal recording apparatus comprising:
(a) video input means for inputting a digital video signal;
(b) audio input means for inputting an audio signal and generating a plurality of kinds of digital audio signals, said plurality of kinds of digital audio signals representing different sounds, respectively;
(c) video signal processing means, including compression means which compresses an information amount of the digital video signals, for receiving the digital video signal and selectively outputting a first digital video signal whose information amount is compressed by said compression means and a second digital video signal having an information greater than said first digital video signal;
(d) recording means for recording the digital video signal and the digital audio signal on a recording medium; and
(e) control means for controlling said recording means, said control means including mode switching means for switching a mode of said apparatus between a plurality of modes including a first mode in which said recording means records said first digital video signal and first digital audio signals representing a first sound and a second mode in which said recording means records said second digital video signal and second digital audio signals representing a second sound different from the first sound.

19. An apparatus according to claim 18, wherein said plurality of kinds of digital audio signals include (i) a two-channel stereo audio signal, (ii) a right-channel signal and a left-channel signal of a stereo voice signal, (iii) a signal of a sum of the right channel and left-channel signals, and a (iv) a signal of a difference thereof.

20. An apparatus according to claim 19, wherein, in said first mode, said recording means records said first digital video signal and said signal of a sum in a first area of said plurality of areas on said recording medium, and records said signal of a difference in a second area on said recording medium different from said first area, and in said second mode, said recording means records said second digital video signal, and said two-channel stereo audio signal in said first area.

21. An apparatus according to claim 20, further comprising additional audio input means for inputting an additional audio signal,
and wherein the recording means records said additional audio signal in the second area in the second mode.

22. An apparatus according to claim 21, wherein said additional audio signal comprises an audio signal of two channels.

23. An apparatus according to claim 19, wherein the audio input means includes a matrix circuit for forming the sum signal and the difference signal by using the right and left channel signals.

24. An apparatus according to claim 20, further comprising additional audio input means for inputting an additional audio signal, and wherein said plurality of modes includes an after recording mode in which the recording means records the additional audio signal in the second area.

25. An apparatus according to claim 24, wherein in the after recording mode, the additional audio signal comprises a signal of one channel which is recorded in the second area on the recording medium when the first digital video signal and the sum signal have been recorded in the first area.

26. An apparatus according to claim 24, wherein in the after recording mode, the additional audio signal comprises signals of two channels which are recorded in the second area on the recording medium which has been recorded in the second mode.

27. An apparatus according to claim 18, wherein the recording medium is a tape-shaped recording medium and the recording means includes rotary heads which obliquely trace on the tape-shaped recording medium, thereby sequentially forming a number of tracks which are parallel with each other.

28. An apparatus according to claim 27, wherein the recording means forms a predetermined number of tracks per unit time in the first mode and forms a number of tracks larger than said predetermined number per said unit time in the second mode.

29. A signal recording apparatus comprising:
(a) audio signal processing means for inputting an audio signal and generating a plurality of kinds of digital audio signals, said plurality of kinds of digital audio signals representing different sounds, respectively;
(b) video signal processing means for inputting a video signal and selectively outputting a plurality of different kinds of digital video signals having different information amounts respectively, said video signal processing means including compression means for compressing the information amount of the input video signal;
(c) recording means for recording the digital video signal and the digital audio signal on a recording medium; and
(d) control means for changing the kind of the digital audio signal to be recorded by said recording means, in accordance with the kind of video signal to be recorded by said recording means.

30. An apparatus according to claim 29, wherein said plurality of kinds of digital audio signals include a first digital audio signal representing a first sound and a second digital audio signal representing a second sound different from the first sound, and wherein said plurality of kinds of video signal include a first digital video signal having an information amount compressed by said compression means, and a second digital video signal having an information amount which is greater than the information amount of the first digital video signal.

31. An apparatus according to claim 30, wherein said plurality of kinds of digital audio signals include (i) a two-channel stereo audio signal, (ii) a right-channel signal and a left-channel signal of a stereo voice signal, (iii) a signal of a sum of the right-channel and left-channel signals, and (iv) a signal of a difference thereof.

32. An apparatus according to claim 31, wherein when the first digital video signal is recorded, said recording means records said first digital video signal together with said signal of a sum in a first area on said recording medium and records said signal of a difference in a second area on said recording medium, and wherein when the second digital video signal is to be recorded, said recording means records said second digital video signal together with said two-channel stereo audio signal in said first area.

33. An apparatus according to claim 30, wherein said recording means includes a head for tracing the recording medium to form a plurality of tracks thereon and recording the digital audio signal and the digital video signal in said plurality of tracks.

34. An apparatus according to claim 33, wherein said recording means records the first digital video signal of one picture in a predetermined number of tracks and records the second digital video signal of one picture in a number of tracks greater than said predetermined number of tracks.

* * * * *

UNITED STATES PATENT AND TRADEMARK OFFICE
CERTIFICATE OF CORRECTION

PATENT NO. : 5,499,104
DATED : March 12, 1996
INVENTOR(S) : HIDENORI HOSHI, et al.

It is certified that error appears in the above-indentified patent and that said Letters Patent is hereby corrected as shown below:

IN THE ABSTRACT

Line 13, "reproduction" should read --reproduction of--.

IN THE DRAWINGS

Sheet 3

Figure 28, "DEGITAL" should read --DIGITAL--.

UNITED STATES PATENT AND TRADEMARK OFFICE
CERTIFICATE OF CORRECTION

PATENT NO. : 5,499,104
DATED : March 12, 1996
INVENTOR(S) : HIDENORI HOSHI, et al.

It is certified that error appears in the above-indentified patent and that said Letters Patent is hereby corrected as shown below:

COLUMN 6

Line 43, "10 The switching" should read
                --¶ The switching--.
        Line 49, "he" should read --the--.
        Line 65, "an" should read --can--.

Signed and Sealed this

Ninth Day of July, 1996

Attest:

BRUCE LEHMAN

Attesting Officer    Commissioner of Patents and Trademarks